Patented Sept. 25, 1951

2,569,430

UNITED STATES PATENT OFFICE 2,569,430

BONDED ALUMINA REFRACTORIES AND MANUFACTURE

Herbert S. Schroeder, Niagara Falls, and Ian M. Logan, Lewiston, N. Y., assignors to The Carborundum Company, Niagara Falls, N. Y., a corporation of Delaware No Drawing. Application June 20, 1949, Serial No. 100,295

10 Claims. (Cl. 106—65)

This invention relates to refractory articles of manufacture, and more particularly to bonded high alumina refractory articles and methods for the manufacture thereof.

One serious weakness of bonded alumina refractories in the past has been their extremely low strengths at high temperatures. Another weakness of bonded alumina refractory shapes has been their inability to stand up under any substantial load when subjected to high temperatures. These property weaknesses of bonded alumina refractories of the prior art, together with all the disadvantages stemming therefrom, have greatly restricted the range of use of such products and there has been a continued effort to find ways of increasing their hot strength and load carrying capacity.

It is an object of the present invention to provide bonded high alumina refractory articles having improved hot strength properties.

We have discovered that if white alumina ore or other equivalent source of relatively pure alumina is fused with a sufficient amount of silica to provide about 2–8% by weight of silica in the resulting fused material, and the fused material crushed to the desired particle sizes and used with suitable bonding material to make bonded high alumina shapes, the resulting articles have remarkably superior properties in many respects to the bonded alumina or high alumina refractories heretofore made. The resulting articles are found to be unexpectedly high in hot strength and load-carrying ability. One source of the alumina for making the fused, silica-containing alumina used in carrying out the present invention is the type of alumina referred to as white alumina ore normally employed in making the more pure, so-called white form of fused alumina grain, and is one in which such impurities as iron and titania are not present, the chief impurity being a small amount of residual alkali oxide such as sodium oxide present as a result of the source and/or previous processing of the alumina ore. One such alumina which has been found to be highly satisfactory in carrying out the present invention is the white alumina sold by the Aluminum Company of America, and designated by them as A-1 grade white alumina ore.

The granular, silica-containing fused alumina as made in accordance with the present invention is usually white in color, although under certain conditions of fusion, as, for example in cases where there is a carbon contamination from the electrodes in the molten material of the bath the grain may have a light greyish appearance which usually disappears entirely or for the most part during the firing of the refractory articles composed thereof. The refractory, fused alumina grain which is used as the primary refractory granular material in the products of the present invention can be further described as containing about 2 to 8% silica, and being otherwise substantially free from impurities. Slight amounts of alkali oxides in the neighborhood of ½% or less can be tolerated.

In order that the invention may be more fully understood, the following examples are set forth by way of illustration:

Example I

A mixture of 96½% by weight A-1 grade white alumina ore and 3½% by weight flint is fused in an electric furnace and the resulting fused material cooled in the form of large ingots. The resulting fused mass which upon analysis is shown to contain around 2.7% silica is crushed to the desired grit sizes and used in the following mix composition to make bonded refractory articles.

| | Parts by weight |
|---|---|
| Fused alumina (as made above) 6–12 grit size | 15 |
| Fused alumina (as made above) 14–36 grit size | 25 |
| Fused alumina (as made above) 40–70 grit size | 20 |
| Fused alumina (as made above) 80 and finer | 20 |
| Clay-alumina bond | 20 |
| Dry lignone (dried residue from concentration of cellulose sulfite waste liquor) | 1 |
| Water | 5.2 |

After thorough mixing the above composition is molded into standard refractory brick shapes 9" x 4½" x 2½" at a pressure of over 5000 pounds per square inch, dried and fired at cone 16.

Example II

A mixture of 90% A-1 grade white alumina ore and 10% flint is fused in an electric furnace and the resulting fused material cooled in the form of large ingots. The resulting fused mass which upon analysis is shown to contain about 6.7% silica is crushed to the desired grit sizes and used in the following mix composition to make bonded refractory articles:

| | Parts by weight |
|---|---|
| Fused alumina (as made above) 6–12 grit size | 15 |
| Fused alumina (as made above) 14–36 grit size | 25 |
| Fused alumina (as made above) 40–70 grit size | 20 |
| Fused alumina (as made above) 80 and finer | 20 |
| Clay-alumina bond | 20 |
| Dry lignone (dried residue from concentration of cellulose sulfite waste liquor) | 1 |
| Water | 5.2 |

After thorough mixing the above composition is molded into standard refractory brick shapes 9" x 4½" x 2½" at a pressure of over 5000 pounds per square inch, dried and fired at cone 16.

The A-1 grade white alumina ore used in Examples I and II above was obtained from the Aluminum Company of America and is reported to have the following typical analysis:

| | Percentage |
|---|---|
| $Al_2O_3$ (dry basis) | 98.89 |
| $Na_2O$ | 0.55 |
| $SiO_2$ | 0.03 |
| $Fe_2O_3$ | 0.03 |
| $TiO_2$ | 0.004 |
| $H_2O$ (combined) | 0.50 |
| $H_2O$ (free) | 1.25 |

A suitable furnace for making the silica-bearing alumina material used in the present invention is an electric arc furnace with vertical electrodes depending into the furnace pot or crucible such as shown in U. S. Letters Patent No. 929,517 granted to Frank J. Tone on July 27, 1909.

The mixture of oxides is gradually fed to the furnace around the electrodes until the furnace is filled with molten material to the sufficient or desired amount. The current is then turned off and the material allowed to cool and the ingot removed from the furnace and crushed into various sizes of granular material; or the molten material may be cast into ingots of any desired shape, cooled and crushed to the desired grit sizes.

The following table shows the various properties of bonded refractory products which have been obtained with articles made in accordance with Examples I and II above and shows the marked superiority of products of the present invention in many respects over standard alumina or mullite refractory products:

Table of properties

| | Bonded Product Made According to Example I above (alumina made from fusion of 96½% alumina and 3½% silica) | Bonded Product Made According to Example II above (alumina made from fusion of 90% alumina and 10% silica) | Standard Bonded Alumina Products Made From Alumina Grain Containing Iron Oxide and Titanium Oxide Impurities | Standard Bonded Products Using Mullite Grain |
|---|---|---|---|---|
| Modulus of Rupture at 1350° C. (Hot transverse Strength in pounds/sq. inch) | 658 | 851 | 139 | 262.5 |
| Per Cent Cold Contraction (after heating 1½ hrs. at 1500° C.) | 0.212 | 0.045 | 1.82 | 0.700 |
| Spalling test, per cent loss after 20 cycles | 0.00 | 0.00 | 0.00 | 0.00 |
| Per Cent Porosity | 22.85 | 21.60 | 28.30 | 24.1 |
| Per Cent Absorption | 7.93 | 7.60 | 10.52 | 9.85 |
| Density, gms./cc. | 2.88 | 2.84 | 2.68 | 2.43 |
| Permeability, cc./1" unit | 3.51 | 2.77 | 48.10 | 2.80 |
| Load carrying test, 88/hrs. at 1350° C., 50 p. s. i. load | 1.32% cold contraction | 0.83% cold contraction | crushed after 17 hours | 0.56% cold contraction |
| High temperature load-carrying test, 25 p. s. i. at 1706–1712° C. for 1½ hrs. | 4.1% cold contraction | 2.64% cold contraction | crushed before reaching temperature | 2.42% cold contraction |

In the above table, in addition to listing the properties of bonded products made in accordance with Examples I and II above of the present invention, properties are set forth for similar products made from standard alumina and mullite fused grains, respectively, for purposes of comparison. The bonded standard alumina and mullite products of the table used for comparison were made from the same selected gradation of grit sizes of granular refractory material used in making the products of Examples I and II and employ the same type and amount of bond and were pressed and fired under the same conditions used in making the products of Examples I and II. The sole difference between the various products set forth in the table is in the composition of refractory granular material used in making the products of each type.

It will be noted from a study of the above table that bonded shapes made in accordance with Examples I and II of the present invention, in which the fused alumina refractory particles from which the articles were made contained 2.7% and 6.7% of silica, respectively, had moduli of rupture at 1350° C. of 658 pounds per square inch and 851 pounds per square inch, respectively, as compared with a modulus of rupture for standard alumina of 139 pounds per square inch and a modulus of rupture for bonded mullite products of 262.5 pounds per square inch.

Attention is also directed to the fact that articles made in accordance with Example I wherein the fused alumina refractory particles of the product contained 2.7% silica, when subjected in a sustained load-carrying test to a load of 50 pounds per square inch for 88 hours at a temperature of 1350° C., upon cooling showed a contraction of only 1.32% whereas a bonded alumina product of the standard type crushed under a similar load and temperature after only 17 hours. A similar load-carrying test conducted at temperatures of 1706–1712° C. for a period of 1½ hours showed the products made in accordance with Examples I and II to have a contraction when cooled of 4.1% and 2.64%, respectively, whereas similarly bonded alumina refractories in which conventional alumina grain was used crushed before reaching those temperatures.

In addition to the improved hot strength characteristics of the products made in accordance with the practice and teachings of the present invention, the table above shows that in other properties such as spalling resistance, porosity, absorption and permeability, the present products compare favorably with conventional bonded mullite and alumina products of the prior art. For example, the higher density and lower porosity, absorption and permeability figures for the products of the present invention are indicative of greater resistance to penetration and attack by corrosive and erosive elements during use and for that reason combine to make the present product more resistant to breakdown from such causes. Is spite of the increase in density it is noted that the resistance to spalling of the products of the present invention is as satisfactory as that of other products of the prior art made from conventional alumina or mullite materials.

Having described the present invention in detail, it is desired to claim:

1. A bonded refractory article comprising granular fused alumina and a ceramic bond, said granular fused alumina containing 2% to 8% silica and being otherwise substantially pure aluminum oxide.

2. A bonded refractory article comprising granular fused alumina and a ceramic bond, said granular fused alumina containing approximately 3% silica and being otherwise substantially pure aluminum oxide.

3. A bonded refractory article comprising a high purity fused alumina grain containing 2% to 8% silica.

4. A bonded refractory article comprising fused granules of white alumina containing 2% to 8% silica.

5. A bonded refractory article comprising fused white alumina containing 2% to 8% silica and less than .5% of alkali oxide.

6. A bonded refractory article comprising fused white alumina containing 2% to 8% silica and less than .5% of alkali oxide and substantially free from titania and iron oxide.

7. A bonded refractory article comprising fused white alumina containing 2% to 8% silica, said alumina being in a gradation of particle sizes as great as 6 mesh size, and a ceramic bond for said alumina comprising clay and finely divided alumina.

8. A raw batch for the manufacture of bonded alumina refractory shapes, said raw batch comprising fused granules of white alumina containing 2% to 8% silica.

9. A raw batch for the manufacture of bonded alumina refractory shapes, said raw batch comprising granules of fused white alumina containing 2% to 8% silica and a ceramic bonding material.

10. A raw batch for the manufacture of bonded alumina refractory shapes, said raw batch comprising granules of fused white alumina containing 2% to 8% silica, finely divided alumina, and clay.

HERBERT S. SCHROEDER.
IAN M. LOGAN.

REFERENCES CITED

The following references are of record in the file of this patent:

UNITED STATES PATENTS

| Number | Name | Date |
|---|---|---|
| 2,017,056 | Easter | Oct. 15, 1935 |
| 2,019,209 | Bemer et al. | Oct. 29, 1935 |
| 2,272,618 | Fessler et al. | Feb. 10, 1942 |

FOREIGN PATENTS

| Number | Country | Date |
|---|---|---|
| 377,964 | France | 1907 |
| 787,931 | France | 1935 |
| 47,611 | France | 1937 |
| 551,421 | Great Britain | 1943 |

OTHER REFERENCES

Ser. No. 269,236, Klingler et al. (A. P. C.), published May 11, 1943.